United States Patent
Maciel et al.

(10) Patent No.: US 7,167,854 B2
(45) Date of Patent: Jan. 23, 2007

(54) DATABASE CONTROL METHOD

(75) Inventors: Frederico Buchholz Maciel, Kokubunji (JP); Daisuke Ito, Kokubunji (JP); Kazutomo Ushijima, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 243 days.

(21) Appl. No.: 10/835,055

(22) Filed: Apr. 30, 2004

(65) Prior Publication Data

US 2005/0027719 A1 Feb. 3, 2005

(30) Foreign Application Priority Data

Aug. 1, 2003 (JP) ............................ 2003-285215

(51) Int. Cl.
*G06F 17/30* (2006.01)
(52) U.S. Cl. .............................................. 707/2; 707/8
(58) Field of Classification Search ................ 718/102; 711/114, 202; 707/202, 2, 8
See application file for complete search history.

(56) References Cited

U.S. PATENT DOCUMENTS

| | | | | |
|---|---|---|---|---|
| 5,860,137 | A * | 1/1999 | Raz et al. ................... | 711/202 |
| 5,905,995 | A * | 5/1999 | Tabuchi et al. ............. | 711/114 |
| 5,907,849 | A * | 5/1999 | Dias et al. .................. | 707/202 |
| 6,173,306 | B1 * | 1/2001 | Raz et al. ................... | 718/102 |
| 6,192,359 | B1 | 2/2001 | Tsuchida et al. | |
| 6,405,284 | B1 * | 6/2002 | Bridge ........................ | 711/114 |
| 2005/0154731 | A1 | 7/2005 | Ito et al. | |

OTHER PUBLICATIONS

IBM DB2 Universal Database "Administration Guide: Planning" Version 8.
IBM DB2 Universal Database "Administration Guide: Performance" Version 8.
"HIRDB7" webpage:www.Hitachi.co.jp/Prod/comp/soft1/global/prod/hirdb/Index.html.
"Job Management Partner 1" Version 6i, Advanced Edition.
"Integrated Network Management VIII Managing it All" IFIP/IEEE Eighth International Symposium on Integrated Network Management (IM 2003) Mar. 24-28, 2003, Colorado Springs, USA.
Hitachi Cruise Control For the Hitachi Freedom Storage Lightning 9900 Series "Maximize Your Investment Minimize Your Risk" Dec. 2001.
DATA SHEET: "EMC Control Center Symmetrix Optimizer".
DATA SHEET: "EMC DATABASE TUNER".
InfiniBand Architecture Specification vol. 1, Release 1.0.a. Jun. 19, 2001 final.

* cited by examiner

*Primary Examiner*—Apu M. Mofiz
(74) *Attorney, Agent, or Firm*—Mattingly,Stanger,Malur & Brundidge,P.C.

(57) ABSTRACT

The present invention aims to dynamically re-configure hosts and storage in a shared-nothing database. In the shared-nothing database, processes 24 to 29 executed in the hosts 11 to 14 access data of a storage device 30. A system manager 70 and a database manager 10 manage the hosts 11 to 14 and the storage device 30. The processes 24 to 29 access one or more disks 51 to 54 of the storage device. To add or reduce the number of the hosts, the processes 24 to 29 are reassigned among the hosts 11 to 14.

1 Claim, 6 Drawing Sheets

DATABASE CONTROL METHOD

CLAIM OF PRIORITY

The present application claims priority from Japanese application JP 2003-285215 filed on Aug. 1, 2003, the content of which is hereby incorporated by reference into this application.

FIELD OF THE INVENTION

The present invention relates to databases, particularly, to the increase/reduction of the number of hosts that execute processing in a shared-nothing database or of the disks in which the data of this database is stored.

BACKGROUND OF THE INVENTION

To improve the performance of database processing (e.g., searching), a method in which a plurality of CPUs and disks are simultaneously used to parallelize the processing is often used. As shown in FIG. 6, a shared-nothing database is an architecture for achieving this parallelization. The shared-nothing database includes a plurality of hosts 11 to 14 (information processing devices having CPUs, such as servers) and a plurality of disks 81 to 84. Each host executes one or more database processes (jobs for executing the processing) 20 to 23. In the present invention, the term "database" is not used for data such as database tables, but for the system (including information processing devices, a network, and storage) that executes the database processing.

A characteristic of shared-nothing databases is such that each host 11 to 14 accesses only the disks belonging thereto. For example, the host 11 accesses the disk 81, but does not access the disks 82 to 84. If necessary, the hosts 11 to 14 transfer data to each other to execute the database processing (not shown in the figure). Consequently, the hosts need less synchronization operations, which increase the scalability of the database.

When a database manager 110 of the shared-nothing database receives a query from a client accessing the database, it assigns the processes to the hosts 11 to 14, collects results of the processing of the hosts 11 to 14, and returns the result of the query to the client (not shown in the figures).

HiRDB and DB2 are examples of shared-nothing databases (about DB2, see "IBM DB2 Universal Database Administration Guide: Planning" SC09-4822-00, IBM, "searched on Jul. 1, 2003", webpage: http://www.linguistik.uni-erlangen.de/tree/pdf/DB2/db2d0e50.pdf, the hosts 11 to 14 shown in FIG. 6 correspond to partitions of DB2).

To extend a shared-nothing database, the hosts 11 to 14 and the disks 81 to 84 are added. Addition of the hosts 13, 14 and the disks 83, 84 surrounded by a dotted-lined, round-cornered rectangle of FIG. 6 is explained in the following.

At the time that the hosts 13, 14 are added, there is no data in the disks 83, 84, so the hosts 13, 14 cannot execute the database processing. As a result, the processing is concentrated on the hosts 11, 12, so efficient parallelization cannot be achieved.

A system described in "IBM DB2 Universal Database Administration Guide: Performance, SC09-4821-00" has a function for redistributing data to solve the above problem. This redistributing function is hereinafter called "re-balancing". In re-balancing, database processes 20 to 23 transfer data while accessing the disks 81 to 84 in a way that the data becomes equally distributed among the disks 81 to 84. As a result, the performance of the database is improved. In HiRDB ("HiRDB7", searched on Mar. 8, 2004, webpage: http://www.hitachi.co.jp/Prod/comp/soft1/groval/prod/hirdb/index.html), re-balancing can be done on-line (i.e., without interrupting the processing).

An administrator of the computer system which includes the database uses the system manager 170 to operate this system. In FIG. 6, components of the system are other than the database are not shown. The system manager 170 monitors performance and availability of each component of the system to control each component according to policies specified by the administrator. As an example of a system manager 170, JP1 is known ("Job Management Partner Version 6i", Hitachi, Ltd., "searched on Jul. 1, 2003", webpage: http://www.hitachi.co.jp/Prod/comp/soft1/jp1/html/sei.html).

As a shared-data database, a system in which hardware construction can be dynamically changed is known (see U.S. Pat. No. 6,405,284).

In the above-described shared-nothing database, there are the following problems.

A first problem is lack of flexibility for extending the shared-nothing database. To extend a shared-nothing database, the hosts and the disks corresponding thereto need to be simultaneously added. However, in a shared-nothing database, because the hosts and disks cannot be separately added, it is difficult to balance the processing performance (the number of the hosts) and capacity and performance of the storage (the number of the disks).

For example, in FIG. 6, to add the hosts 13, 14, the disks (physical disks) 83, 84 corresponding to these hosts need to be added. At the time of the addition, the disks 83, 84 have no data, so that data need to be redistributed from the disks 81, 82 of the hosts 11, 12 to the newly added disks 83, 84.

In this redistribution, the hosts 11, 12 need to execute redistribution in addition to the database processing, so that sometimes the hosts 11, 12 are overloaded and the database processing is delayed. The redistribution takes a long time; particularly, in large databases, the redistribution may take about a day in some cases. Accordingly, it is difficult to quickly extend a shared-nothing database.

A second problem relates to the time for re-configuring the database. Recently, grid technologies (which include re-configuration) have been used to improve system efficiency and to reduce the costs,. There are various examples of system re-configuration, as follows.

(1) The number of the hosts is increased when a peak of access to, e.g., websites occurs.
(2) Part of the system for on-line processing in the daytime is changed to batch processing in the night (when on-line load is decreased).
(3) The number of the hosts is increased when a peak of the processing load occurs in a specific time (such as sales, concentration of term ends, or successive holidays).

VPDC is an example of a system that performs these three types of re-configuration (see "VPDC: Virtual Private Data Center (A Flexible and Rapid Workload-Management System)", Mineyoshi Masuda, Yutaka Yoshimura, Toshiaki Tarui, Toru Shonai, Mamoru Sugie, The 8th IFIP/IEEE International Symposium on Integrated Network Management (IM2003), March 2003.)

However, in system re-configurations, database re-configurations need the addition or reduction of the number of hosts or disks. Re-balancing can be used to perform this re-configuration. However, re-balancing needs a large amount of processing and, as previously mentioned, takes a large amount of time. Particularly in the case of on-line re-balancing, re-balancing and normal database processing are simultaneously executed, so the re-balancing time becomes even longer. Re-balancing is still rarely executed, so the processing time has not been a problem. However, re-balancing is inappropriate if system re-configuration is frequently executed.

SUMMARY OF THE INVENTION

For solving these problems, an object of the present invention is to quickly execute a dynamic re-configuration of the hosts and storage in the shared-nothing database.

In one aspect, the present invention resides in a database control method comprising: a shared-nothing database in which processes executed in a plurality of information processing devices access data of a storage; and management means for managing the information processing devices and the storage, wherein the processes occupy and access one or more volumes, and wherein the management means reassigns the processes among the information processing devices when the number of the information processing devices is increased or reduced.

In another aspect, the present invention resides in the database control method comprising: a shared-nothing database in which processes executed in a plurality of information processing devices access data of a storage including virtual volumes; and management means for managing the information processing devices and the storage, wherein: the storage accesses data by associating the virtual volumes with physical volumes; the processes access one or more virtual volumes of the storage, the virtual volumes being set by the management means; and when the number of information processing devices or physical volumes is increased or reduced, the management means causes the storage to activate reassignment of the virtual volumes and physical volumes.

As described above, the present invention is constructed such that the number of the information processing devices is increased or reduced by reassigning a plurality of the processes processing the shared-nothing database, so as to distribute the processes among the information processing devices. This construction enables the number information processing devices of the shared-nothing database to be quickly and easily increased or reduced, and also to eliminate the use of re-balancing and thereby improving availability of the shared-nothing database.

Further, the present invention is constructed such that in order to increase or reduce the number of physical volumes, the management means activates, in the storage, the reassignment of the virtual volumes and physical volumes. This enables the physical volumes of the shared-nothing database to be quickly and easily added or reduced.

Accordingly, the information processing devices and the physical volumes can be separately extended to dynamically re-configure the shared-nothing database. This enables an adequate balance between the processing ability of the database (the number of the information processing devices) and capacity and performance of the storage (the number of the physical volumes). Additionally, the re-configuration of the database is faster than that of the related arts. As a result, the range of applications in which shared-nothing databases can be applied, e.g., response to unexpected peaks, switch between daytime on-line processing and night batch processing, can be expanded.

DETAILED DESCRIPTION OF THE PREFERRED EMBODIMENTS

Three preferred embodiments of the present invention are separately explained in the following. In a first embodiment, increase/reduction of the number of hosts is explained. In a second embodiment, increase/reduction of the number of disks is explained. In a third embodiment, a method for determining the increase/reduction is explained.

ENTIRE CONFIGURATION

Figure 1:
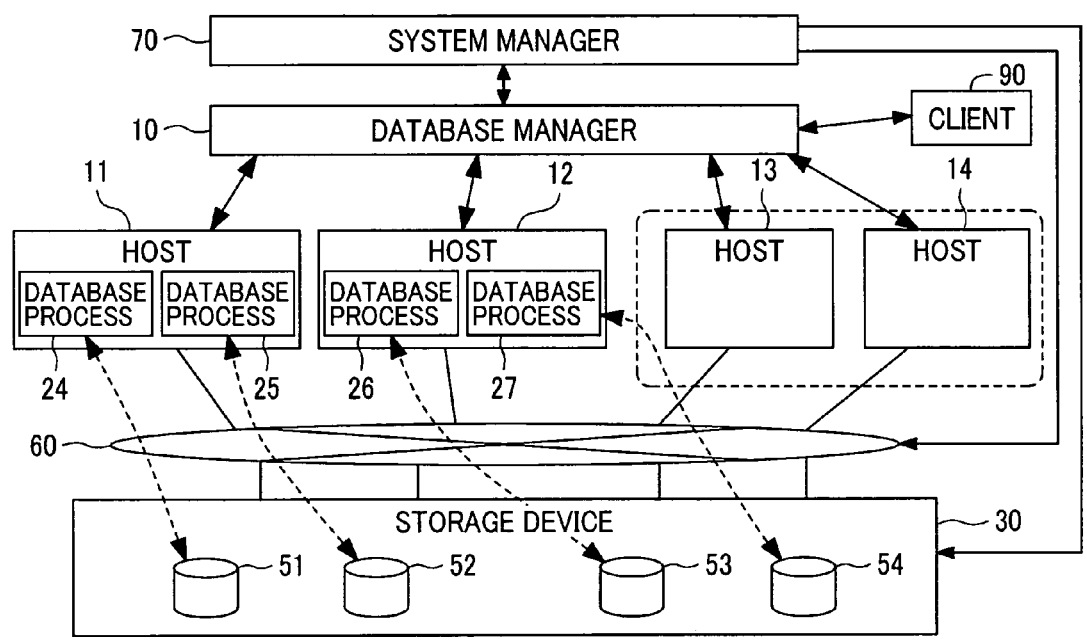
FIG. 1 is a system block diagram of one example of the present invention, showing a first step when hosts are added.

FIG. 1 shows one example of a shared-nothing database.

The shared-nothing type database includes a plurality of hosts 11, 12 (information processing devices having, e.g., CPUs, memories, and I/O, such as a database server) and a plurality of disks 81 to 84. Each host executes one or more of database processes (hereinafter called database processes) 24 to 27 which process the database. In the present invention, the term "database" is not used for data of, e.g., database tables, but for the system including information processing devices, a network, and storage devices, that executes database processing. Each database process 20 to 23 is a job that executes the database processing. In FIG. 1, hosts 13, 14 are added as described below.

In each host 11, 12, a plurality of database processes 24 to 27 are executed. The processes 24 to 27 read and write data of disks (or volumes) 51 to 54, which are assigned thereto respectively.

These disks 51 to 54 are contained in a storage device 30 controlled by a system manager 70. The storage 30 is connected to the hosts 11 to 14 via a storage area network (hereinafter called a SAN) 60. The SAN 60 is controlled by the system manager 70, and includes a plurality of switches and loop type connection.

The SAN 60 and the storage device 30 function as means with which the database processes share the disks (or volumes).

The hosts 11, 12 execute the database processing upon reception of instructions from a database manager 10. The database manager 10 determines the database processes or disks that actually execute the processing upon reception of requests from a client 90. The database manager 10 returns results of the database processing to the client 90.

The database manager 10 includes, e.g., a program which functions on predetermined hardware (e.g., a server). In other words, the database manager 10 is a front-end server, and the hosts 11 to 14 are backend servers.

The database manager 10 monitors the entire database system, and is controlled by a system manager 70. The system manager 70, like the above-described "JP1", monitors performance and availability of each component of the system, such as the database, and controls each component according to policies specified by a system administrator.

For example, the system manager 70 monitors processing load of the hosts 11, 12. The system manager 70 instructs the database manager 10 to add hosts when the processing load becomes large, and instructs the SAN 60 and the storage device 30 to change disks 51 to 54 assigned to the database processes 24 to 27. The system manager 70 may detect the processing load of the hosts 11, 12 via the database manager 10 or directly from the hosts 11, 12.

When the system manager 70 changes the assignment of the database processes 24 to 27 to the disks 51 to 54, it instructs the SAN 60 and the storage device 30 to change the assignment.

[Increase/Reduction in the Number of Hosts]

Next, in FIG. 1, one example when the hosts 13, 14 are added to the hosts 11, 12 is explained.

The database processes 24 to 27, which are executing the database processing, correspond to the disks 51 to 54 (this correspondence and the access routes to the disks are shown as curved dotted lines.) For example, the process 24 of the host 11 accesses the disk 51, and the process 25 of the host 11 accesses the disk 52. Each process accesses a different disk to execute the database processing.

To re-configure the database system, the hosts 13, 14 are added to this database. According to an instruction of the system manager 70, the database manager 10 instructs the hosts to reassign the database processes 24 to 27 to the hosts 11 to 14, so that the hosts 11 to 14 execute the database processes 24 to 27, respectively. To achieve this with activation and completion of the processes, the database processes 25, 27 are terminated in the hosts 11, 12, and the database processes 28, 29 are started in the hosts 13, 14, respectively.

Figure 2:
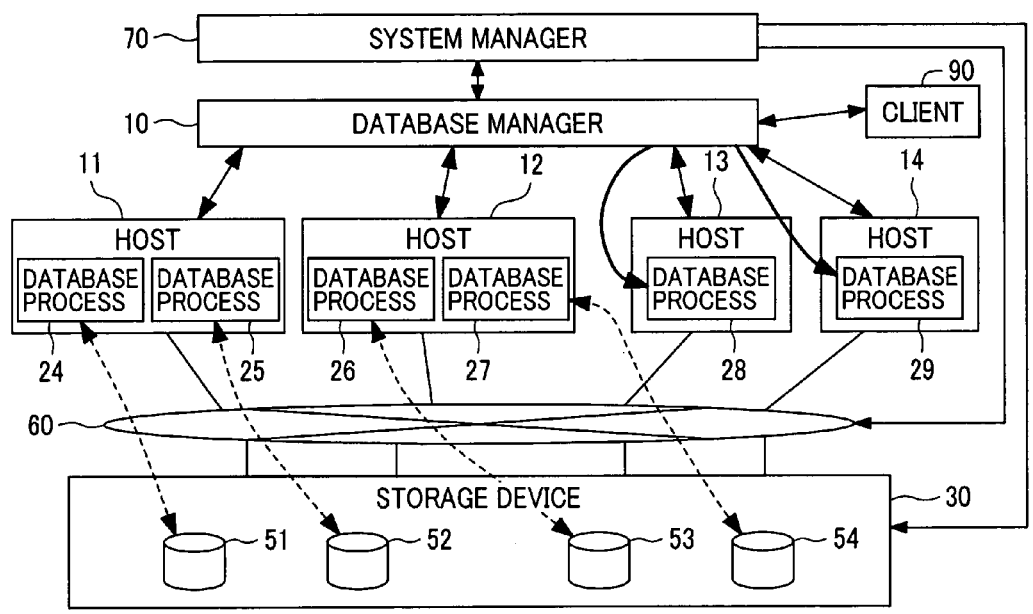
FIG. 2 is the system block diagram of one example of the present invention, showing a second step when the hosts are added.

FIG. 2 shows a second step of this re-configuration. In this step, the database manager 10 starts the database processes 28, 29 in the hosts 13, 14. The database process 28 of the host 13 executes the processing of the database process 25 of the host 11 in its place. The database process 29 of the host 14 executes the processing of the database process 27 of the host 12 in its place.

Figure 3:
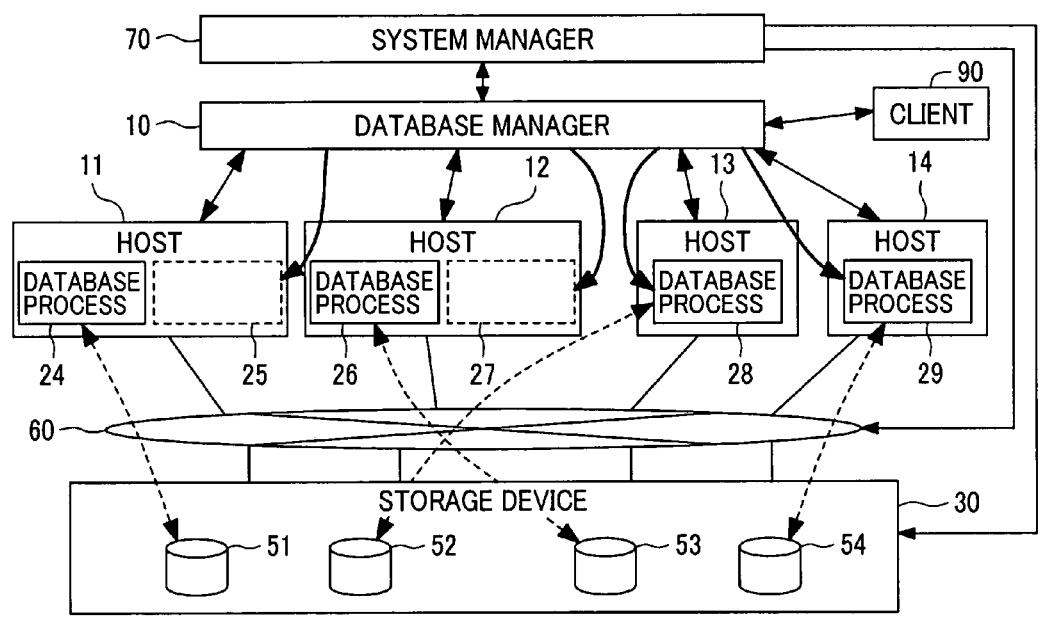
FIG. 3 is the system block diagram of one example of the present invention, showing a third step when the hosts are added.

FIG. 3 shows the last step for the re-configuration. First, the database manager 10, according to an instruction of the system manager 70, causes the disk 52, which was being accessed by the database process 25, to be accessed by the database process 28, and also causes the disk 54, which was accessed by the database process 27, to accessed by the database process 29. Then, the database processes 25, 27 are terminated.

Since the database processing of the hosts caches in them data of the disks 51 to 54, the processes 25, 27, 28, 29 accessing the disks 52, 54 are switched in the following order in FIG. 3. Note that the present invention is not limited to this order.

(1) suspending the database processing
(2) flushing caches of the database processes 25, 27 to the disks 52, 54
(3) restarting the database processing using the database processes 24, 26, 28, 29
(4) terminating the database processes 25, 27

In FIG. 3, to change the assignment of the disks 52, 54 corresponding to the database processes 25, 27, 28, 29, the system manager 70 changes the setting of the storage device 30 and/or storage area network 60. As an example of this setting change, the setting for partition of, e.g., VLAN/zoning of the storage area network 60 and storage device 30 is changed. The system manager 70 reports the setting change of the disk sharing to the database manager 10.

Generally, the hosts 11 to 14 are not permitted to access all the disks 51 to 54. Each of the hosts 11 to 14 is permitted to access only the disk assigned thereto. To achieve this, a method (related art) for dividing the storage area network 60 into a plurality of partitions is known.

However, in the present invention, the correspondence between the hosts 11 to 14 and the disks 51 to 54 is changed. Therefore, when one host takes over an access from another host, the partitioning setting is changed to allow sharing. For example, the disks 51 to 54 are assigned to the same partitions of the hosts 11 to 14 that access them. As a result, the database processes 28, 29 of the newly added hosts 13, 14 can access the disks 52, 54 that were being accessed by the processes 25, 27 of the hosts 11, 12.

In the state of FIG. 1, the disk 51 is assigned to a partition A, the disk 52 is assigned to a partition B, the disk 53 is assigned to a partition C, and the disk 54 is assigned to a partition D. The system manager 70 assigns the host 11 to the partitions A, B thus allowing the host 11 to access these partitions, and also assigns the host 12 the partitions C, D thus allowing the host 12 to access these partitions.

In FIG. 2, when the hosts 13, 14 are added, access permission to the partition B is provided to the hosts 11, 13, and access permission to the partition D is provided to the hosts 12, 14. As a result, the newly added hosts 13, 14 can access the disks 52, 54. At this time, the partition B is shared by the hosts 11, 13, and the partition D is shared by the hosts 12, 14.

Next, in the state of FIG. 3, after termination of the processes 25, 27 of the hosts 11, 12, the access permission to the partition B is provided to only the host 13, and the access permission to the partition D is provided only to the host 14. In such a way, the partitions B, D are accessed by the newly added hosts 13, 14.

The substance of this embodiment is as follows. With start/termination of the database processes 24 to 29, the database processes 24 to 29 are assigned to the hosts 11 to 14 as uniformly as possible, so that the number hosts 11 to 14 can be quickly increased/reduced by the shared-nothing database to quickly adjust the database processing performance. Additionally, the number of the database processes 24 to 29 is not changed, and the construction of the shared-nothing database does not need to be largely changed, so that an existent shared-nothing database product can become a scalable database system through a small development effort.

The addition of the hosts has been explained above. Through a procedure reverse to the above procedure, suspension/start/termination of the database processes are executed to reduce the hosts. This procedure is not explained in detail.

In the addition of the hosts 13, 14 and the transfer of the database processes, the disks 51 to 54 of the storage device 30 are partitioned to change the access permissions of each partition, so that the database system is highly redundant to hardly receive the influence when a failure occurs therein.

[Addition/Reduction of Disks]

In the second embodiment, the increase/reduction of the number of disks is explained. First, storage virtualization and storage optimization, which are the related arts, are explained, because they are used in the second embodiment.

In storage virtualization, the storage device 30 shows virtual disks to the hosts 11 to 14, and the hosts access these virtual disks as normal disks. In this document, unless there is an indication such as "virtual" or "physical" attributes for a "disk", the disk may be virtual or physical. For example, the disks 51 to 54 of FIGS. 1 to 3 may be virtual or physical.

The storage device 30 maps and records data of these virtual disks onto the physical disks. A structure for achieving virtualization in the storage device 30 is called a "virtualization engine". This type of disk virtualization method can use, e.g., U.S. Pat. No. 6,216,202.

Figure 4:
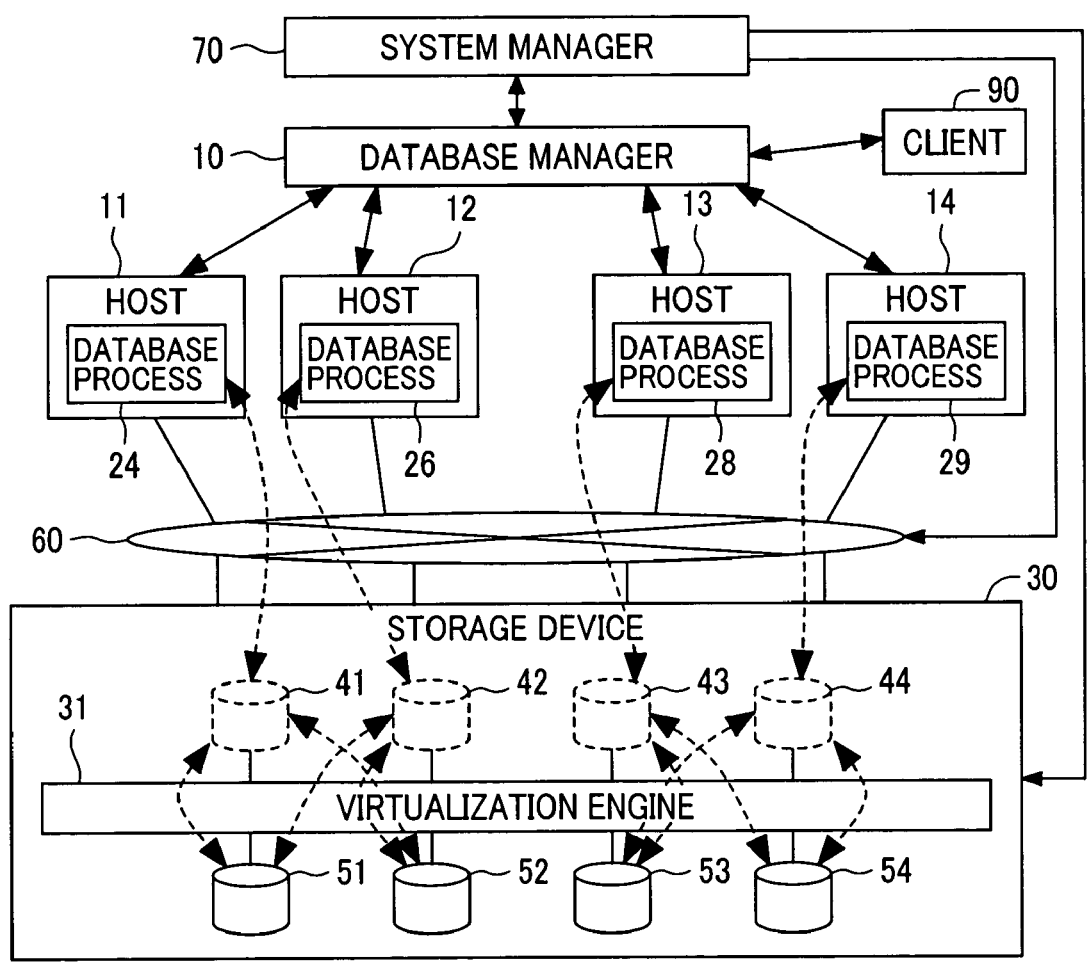
FIG. 4 is the system block diagram of one example of the present invention, showing a first step when disks are added.

FIG. 4 shows one example of the shared nothing type database using storage virtualization. FIG. 4 shows the same state as FIG. 3, but they are different in that the storage device 30 uses virtualization.

The hosts 11 to 14 access virtual disks 41 to 44 produced by a virtualization engine 31 of the storage device 30. (the virtual disks are shown with dotted lines.) The virtualization engine 31 maps and records data of the virtual disks 41 to 44 onto physical disks 51 to 54. (this mapping is shown with dotted lines between the virtual disks 41 to 44 and the physical disks 51 to 54.)

Next, storage optimization is a method for changing mappings between the virtual disks 41 to 44 and the physical disks 51 to 54 to improve the performance. As examples of this function, CruiseControl of Hitachi (see "Hitachi CruiseControl", Hitachi Data Systems), Symmetrix Optimizer of EMC (see "EMC ControlCenter Symmetrix Optimizer", EMC), and U.S. Pat. No. 59/055,995 are cited.

In storage optimization, the contents of the virtual disks 41 to 44 are not changed. (only the contents of the physical disks 51 to 54 are changed.) Therefore, the optimization is transparent to the hosts 11 to 14 (and processes such as the database processes 24 to 29) accessing the virtual disks 41 to 44. The physical disks 51 to 54 can be transparently read/written from/to the hosts 11 to 14.

Next, to increase/reduce the number of physical disks, storage virtualization and optimization are used.

Figure 5:
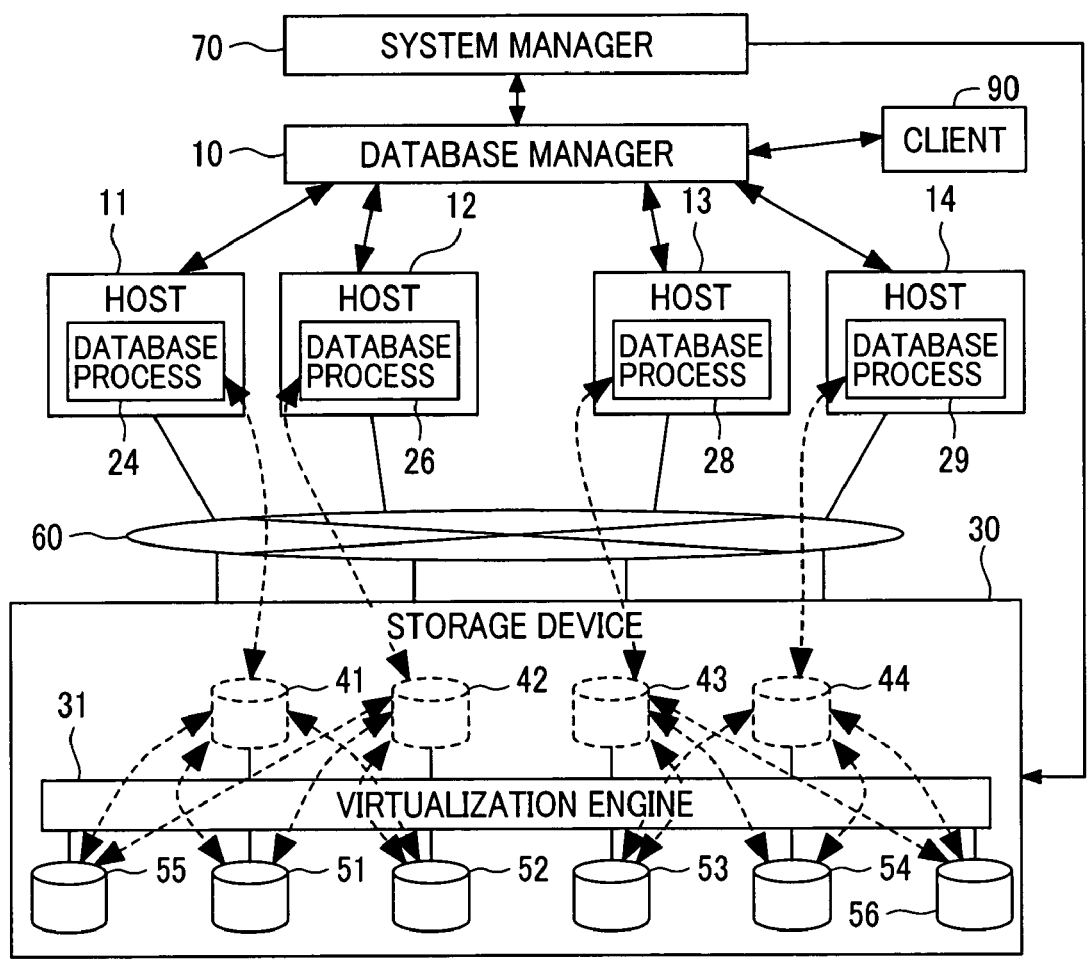
FIG. 5 is the system block diagram of one example of the present invention, showing a second step when the disks are added.
Figure 6:
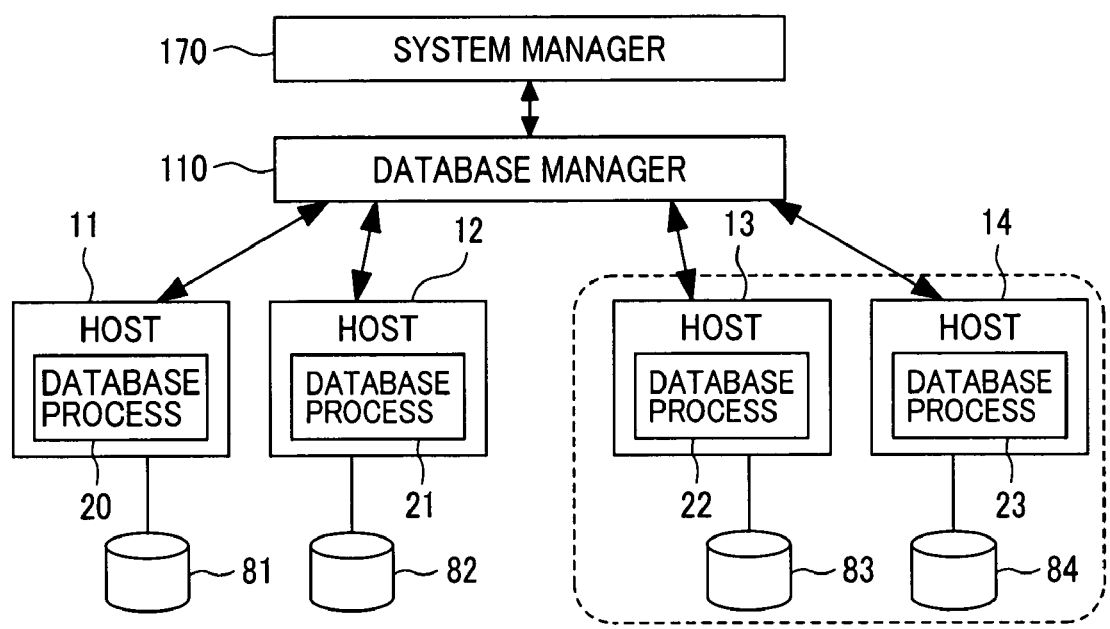
FIG. 6 is a system block diagram of a shared-nothing database, showing the related art.

As this example, FIG. 5 shows a result of optimization by adding physical disks 55, 56 to the state of FIG. 4. Concretely, the optimization is such that part of data of the disks 51, 52 is transferred or copied to the disk 55, and part of data of the disks 53, 54 is transferred or copied to the disk 56.

Since performance of the storage (speed of Reads or Writes) is proportional to the number of the physical disks 51 to 56, the storage performance is improved according to the optimization in which data of the virtual disks 41 to 44 is redistributed from the four physical disks (physical disks 51 to 54) to six physical disks (physical disks 51 to 56), and thus the database process performance is improved.

In the case of storage optimization, data is transferred or copied between the physical disks 51 to 56. This copy is executed inside the storage device 30, and the physical disks 51 to 56 are sequentially accessed. Accordingly, the copy is executed at high speed.

In the case of re-balancing, the database process of one of the hosts 11 to 14 reads data via the SAN 60, and analyzes the contents of the data. If necessary, the data is transmitted to the database process of another host, and finally written via the SAN 60. Therefore, the storage optimization is faster than rebalancing, and thus suitable for fast re-configuration of the database.

The EMC Database Tuner (see "EMC Database Tuner", EMC) is an example of a system manager 70 that manages the database and storage in a coordinated fashion. This consists of monitoring the performance of the database and storage device 30, and correlating their information to analyze where the bottlenecks are located.

In contrast to this related art, in the present invention, as shown in FIG. 5, the system manager 70 activates the optimization in the storage device 30 to adjust the performance of the storage according to the needs of the database. As a result, it is possible to realize a necessary correlation of the database re-configuration to the storage.

When starting the optimization, the system manager 70 can add parameters required for the optimization, such as the number of the hosts and the required performance. The storage device 30, based on these parameters, determines the number of the physical disks 51 to 56 to be used and the mappings between the virtual disks 41 to 44 and the physical disks 51 to 56.

In this second embodiment, the system manager 70 transmits parameters required for the optimization to the storage device 30 to start the optimization, so that the increase/reduction of the number physical disks is realized to adjust the storage performance required for the database. Due to storage virtualization and optimization, the increase/reduction of the number of physical disks is transparent. This embodiment realizes a scalable shared-nothing database while keeping the changes to existing shared-nothing databases to a minimum.

[Determination of Addition/Reduction]

In the third embodiment, a method for determining, e.g., the timing of the increase/reduction of the number of hosts or disks and the amount of resources to be increased/reduced is explained. According to this third embodiment, the number of hosts 11 to 14 and the disks 51 to 56 of the first or second embodiment can be increased or reduced.

The administrator determines when and how much resources of the database are changed. This determination is specified in the system manager 70. This is the simplest determination method in this third embodiment. After that, the system manager 70 controls, e.g., the database manager 10 to add/reduce the hosts 11 to 14 or the disks 51 to 56.

Another method is such that the administrator of the system specifies the performance (throughput and response time) and capacity of the database required to the system manager 70. In this case, the system manager 70 measures the actual performance and capacity, and controls, e.g., the database manager 10 to obtain the specified performance and capacity by re-configuring the database.

A further method is such that the system manager 70 monitors the hosts 11 to 14 and the storage device 30 to check which between the hosts or disks is a bottleneck (or has spare performance). Then, it adds the resource that is a bottleneck (or reduces the amount of the resource that has spare performance). In such a way, the system manager 70 balances the performance of the hosts 11 to 14 and the storage device 30.

A further method is such that the administrator produces policies and records them in the system manager 70. As an example of the policy, a service level (the minimum performance and capacity provided to each customer or user) is specified. A schedule, e.g., a day of a sale and or the time of switching between batch/online processing, can be also recorded as the policy. In this case, the system manager 70 follows these policies (re-configuring the database to obtain the specified service level or re-configuring it at the specified time). This permits the increase/reduction of the number of hosts and disks to be automatically executed.

When the system manager 70 adds resources such as hosts 11 to 14 or disks 51 to 56, brokering is sometimes required. The brokering is such that it checks which resource in the system can be used, the resources to be used are chosen and reserved in a database, and such that, when the amount of resources is reduced, they are freed to be used for other applications.

In brokering, for example, to add resources (hosts or storage), the system manager 70 requests a broker (not shown), which manages resources of grid computing, to reserve and acquire, or to cancel and return the resources.

For example, to add a resource, the system manager 70 requests the broker managing grid computing resources to reserve resources. After that, the resources are acquired according to permission of the broker, and incorporated in the database.

On the other hand, when the amount of resources used is reduced, the system manager 70 reduces the amount of resources and requests the broker to cancel the resource reservation to return these resources. The cancellation of the resource reservation and the resource reduction may be executed simultaneously.

In such a way, by requesting the broker to reserve and acquire the resources, or to cancel the resource reservation and to return the resources, the amount of resources can be increased/reduced.

In this embodiment, the system manager 70 activates the re-configuration according to the instruction of the administrator, the performance and time specified by the administrator, the bottlenecks of the database, or the policies specified by the administrator. In the re-configuration, brokering is executed to acquire/return the resources.

ALTERNATIVES

The present invention is not limited to the above-described embodiments and their alternatives. The present invention can be also realized by the alternatives described below and other alternatives. The present invention can be also realized by a combination of the above-described embodiments, techniques of their alternatives, and the alternatives described below.

Alternative 1

To simplify the explanations in the text and in the figures, each database process was associated with only one disk. However, the present invention is not limited to this embodiment. Each database process 20 to 23 may access one or more of disks 81 to 84, 41 to 44, and 51 to 54.

Alternative 2

To simplify the explanations in the text and in the figures, the database processes access the physical disks 51 to 54 or the virtual disks 41 to 44. However, the present invention is not limited to this embodiment. The database processes may access only part of the virtual/physical disks, such as accessing only partitions produced by the operation system or by the database.

Alternative 3

In FIGS. 1 to 5, the storage device 30 connected to the storage area network 60 is shown as the storage. However, the present invention is not limited to this embodiment. A means for enabling a plurality of the hosts to access a plurality of the physical or virtual disks is sufficient for the first embodiment. The virtualization engine for enabling a plurality of the hosts to access a plurality of the virtual disks is sufficient for the second embodiment. For example, in the first and second embodiments, without the storage area network 60, a plurality of ports of the storage device 30 can be directly connected to the hosts 11 to 14 (these direct connections are sometimes called a "storage area network"). In the first embodiment, without the storage device 30, a plurality of the physical disks 51 to 54 can be directly connected to the storage area network 60.

Alternative 4

In the first embodiment, the number of the database processes 24 to 29 on the hosts 11 to 14 made uniform by starting and terminating the database processes 24 to 29. However, the present invention is not limited to this embodiment. For example, the required number of the database processes 24 to 29 can be previously activated in the hosts 11 to 14, e.g., when the database is started. These processes are not terminated in case of increase of reduction of the number of hosts 11 to 14. In this case, as "the required number of the database processes 24 to 29," a different number of database processes 24 to 29 may be started in each in each of the hosts 11 to 14. In this case, for example, two database processes 24 to 27 are activated in each of the hosts 11, 12, and one database process 28, 29 is activated in each of the host 13, 14.

Alternative 5

In the second embodiment, the virtualization engine 31 is in the storage device 30. However, the present invention is not limited to this embodiment. For example, the virtualization engine 31 may be in the storage area network 60, in the operating systems of the hosts 11 to 14, or in the database processes 20 to 29.

Alternative 6

In the figures of this document, the arrows between the database manager 10, the hosts 11 to 14, and the system manager 70 do not indicate connections but communications. Therefore, between these components, arbitrary network connections are possible. Also, the system manager 70 may directly set the hosts 11 to 14 and also obtain management information, e.g., load of the CPUs and I/O, from them.

Alternative 7

In the second embodiment, the system manager 70 specifies, in the storage device 30, the parameters required for the optimization of the number of the hosts and for the required performance. The present invention is not limited to these parameters, particularly to the parameters of the processing and the load of the I/O.

As described in the alternative 2, the operating system or the database sometimes partitions the disks 41 to 44. Each partition sometimes has a different access load. As another example of the parameters specified by the database manager 10, positions of the partitions of the disks 41 to 44 are reported to the storage device 30. The storage device 30 measures not the loads of all the virtual disks 41 to 44 but the load of each partition to plan the optimization, so that better optimization can be achieved. As an example of this optimization, the mappings between the virtual disks 41 to 44 and the physical disks 51 to 56 are divided at the boundaries of the partitions.

Alternative 8

As described above, the system manager 70 decides to perform the re-configuration and controls the storage device 30 and the storage area network 60. However, the present invention is not limited to this embodiment. For example, the database manager 10 instead can control all or part of these operations. In this case, for example, the database manager 10 may decide to perform the re-configuration, and may also control the storage device 30 and the storage area network 60.

Alternative 9

The database processes 24 to 29 have caches of the data of the disks 51 to 56, respectively. Therefore, in the increase/reduction of the number of hosts, when one database process using a disk, e.g., the disk 52 is switched (in this example, the database process 25 is switched to the database process 28), the cache of the database process that takes over this disk (the database process 28) has no data of this disk (disk 52). As a result, performance of this database process (database process 28) is decreased for a while, and thus the performance of the entire database is decreased.

To solve this problem, while switching the database processes 24 to 29, all or part of the caches or memories are transferred between the database processes 24 to 29. Because networks and storage area network 60 in which data can be transferred directly between the memories of the hosts 11 to 14 without CPUs processing, such as InfiniBand (see InfiniBand Trade Association, "InfiniBand Architecture Specification Volume 1 Release 1.0.a", 2001) will come into wider use, the contents of the caches can be transferred at high speed.

While transferring the contents of the caches, the database processing needs to be suspended. Therefore, it is preferable that this transfer is executed at the same time that the contents of the caches are flushed to the disks 51 to 54 and the processing is already suspended, but the present invention is not limited to this timing. The transfer of the contents of the caches takes time, but since the subsequent performance of the database is high, this method is advantageous.

When process migration is used, the caches can be transferred as part of the data of the process.

Alternative 10

The present invention is not limited to the database processes 24 to 29 executing the database processing such as searching, and is applicable to other processes related to the database processes 24 to 29 in the database.

The alternatives have been described above. A program, which is recorded in a program recording medium such as a disk recording device, for realizing the present invention can be sold as a single product or in combination with other products. The program may be one that is added to a program executing already-used communications program or one which replaces part of the communications program.

According to one aspect of the present invention, the management means changes the assignment of the first and second information processing devices to the volumes according to the setting of the mappings so that the second process accesses the volumes accessed by the first process.

According to the aspect of the present invention, the management means changes the access permission of the first and second information processing devices to the volumes according to the setting of the partition so that the second process accesses the volumes accessed by the first process.

As described above, in the database control method of the present invention, the number of hosts and disks of the shared-nothing database is increased or reduced easily and quickly, so that fields to which the shared-nothing database is applicable, e.g., response to unexpected peaks, switch of daytime on-line processing and night batch processing, are expanded, allowing the realization of a highly available database.

What is claimed is:

1. A database control method of controlling a database by a system resource which includes a plurality of information processing devices and a storage having a plurality of disk areas connected to the plurality of information processing devices via a storage area network, the plurality of disk areas being accessed from the plurality of information processing devices said database control method comprising the steps of:

mapping each of the plurality of disk areas to any one of a plurality of logical disks;

assigning one or more database processes to each of the particular number of information processing devices of the plurality of information processing devices in order to use the particular number of information processing devices to operate the database, the database processes exclusively accessing the plurality of logical disks, respectively;

when the number of the information processing devices is increased, reserving information processing devices that can be used from among information processing devices that are not in use;

selecting and terminating some of the database processes on the information processing devices operating the database, and creating database processes identical to the terminated database processes on the reserved information processing devices; and changing destinations of requests to access the logical disks that were accessed by the terminated database processes to the reserved information processing devices, respectively.

* * * * *